(12) United States Patent
Hoeltgen et al.

(10) Patent No.: US 11,078,061 B2
(45) Date of Patent: Aug. 3, 2021

(54) LIFTING APPARATUS

(71) Applicant: GREY ORANGE PTE LTD., Singapore (SG)

(72) Inventors: Wolfgang Kurt Hoeltgen, Laatzen (DE); Akash Gupta, Delhi (IN); Samay Kohli, New Delhi (IN); Naveen Boppana, Krishna ap (IN); Akshay Bhagat, Chennai (IN)

(73) Assignee: GREY ORANGE PTE LTD., Singapore (SG)

(*) Notice: Subject to any disclaimer, the term of this patent is extended or adjusted under 35 U.S.C. 154(b) by 679 days.

(21) Appl. No.: 15/565,358

(22) PCT Filed: Apr. 8, 2016

(86) PCT No.: PCT/IB2016/000456
§ 371 (c)(1),
(2) Date: Oct. 9, 2017

(87) PCT Pub. No.: WO2016/162746
PCT Pub. Date: Oct. 13, 2016

(65) Prior Publication Data
US 2018/0111808 A1      Apr. 26, 2018

(30) Foreign Application Priority Data

Apr. 9, 2015   (AU) .............................. 2015901269
Apr. 9, 2015   (SG) ........................... 10201502804X (51) Int. Cl.
*B66F 9/06*   (2006.01)
*B65G 1/04*   (2006.01)

(52) U.S. Cl.
CPC ............ *B66F 9/063* (2013.01); *B65G 1/0492* (2013.01)

(58) Field of Classification Search
USPC .................................................. 700/216, 218
See application file for complete search history.

(56) References Cited

U.S. PATENT DOCUMENTS 5,180,275 A    1/1993   Czech et al.
5,470,187 A    11/1995  Smith et al.
(Continued)

FOREIGN PATENT DOCUMENTS

CN    201914890 U       8/2011
CN    203222449 U   *   3/2013
(Continued)

OTHER PUBLICATIONS

Combined Chinese Office Action and Search Report dated Sep. 29, 2018 in Chinese Patent Application No. 201680033269.7 (submitting English translation only), 6 pages.
(Continued)

*Primary Examiner* — Lee D Wilson
*Assistant Examiner* — Mahdi H Nejad
(74) *Attorney, Agent, or Firm* — Oblon, McClelland, Maier & Neustadt, L.L.P.

(57) ABSTRACT

Described herein is a lifting device for raising and lowering a contact member. The lifting device includes an actuator configured to move the contact member between a lowered position and a raised position, wherein in a first mode of operation of the lifting device, the actuator moves the contact member from the lowered position to the raised position without rotating the contact member about a reference axis, and in a second mode of operation of the lifting device, the actuator permits rotational motion of the contact member about the reference axis from the raised position to a modified raised position.

14 Claims, 6 Drawing Sheets

(56) References Cited

U.S. PATENT DOCUMENTS

| | | | |
|---|---|---|---|
| 5,839,876 A | 11/1998 | McCarthy et al. | |
| 9,044,854 B2* | 6/2015 | Sun | B23Q 1/25 |
| 2005/0244259 A1 | 11/2005 | Chilson et al. | |
| 2008/0202286 A1* | 8/2008 | Brechelente | B23Q 5/408 74/841 |
| 2009/0090203 A1* | 4/2009 | Jones | F16H 25/2454 74/89.39 |
| 2013/0101383 A1 | 4/2013 | Lynch, Jr. et al. | |
| 2015/0307276 A1* | 10/2015 | Hognaland | B65G 1/06 700/218 |
| 2016/0236867 A1* | 8/2016 | Brazeau | B65G 1/1378 |
| 2017/0050830 A1* | 2/2017 | Podnar | B66F 9/07568 |
| 2018/0099811 A1* | 4/2018 | Shen | B66F 3/08 |
| 2019/0291955 A1* | 9/2019 | Bastian, II | B65G 1/0492 |
| 2020/0095103 A1* | 3/2020 | Nagasawa | B66F 9/07513 |
| 2020/0156871 A1* | 5/2020 | Fosnight | B65G 1/065 |

FOREIGN PATENT DOCUMENTS

| | | |
|---|---|---|
| CN | 203222449 U | 10/2013 |
| CN | 104317289 A | 1/2015 |
| DE | 10 2009 041 862 A1 | 3/2011 |
| ES | 2 458 594 T3 | 5/2014 |
| JP | 52-133677 | 11/1977 |
| JP | 59-163300 A | 9/1984 |
| JP | 11-260890 A | 9/1999 |
| JP | 2000-294614 A | 10/2000 |
| JP | 2010-514647 A | 5/2010 |
| JP | 2013-107776 A | 6/2013 |
| WO | WO 2009/043474 A2 | 4/2009 |
| WO | WO 2009/043474 A3 | 4/2009 |

OTHER PUBLICATIONS

Extended European Search Report dated Nov. 7, 2018 in European Patent Application No. 16776184.0, 6 pages.

Chilean Office Action dated Nov. 5, 2018 in Chilean Patent Application No. 201702554 (with English translation), 20 pages.

European Office Action dated Nov. 23, 2018 in European Patent Application No. 16776184.0, 1 page.

Combined Chilean Office Action and Search Report dated Feb. 18, 2019 in Chilean Patent Application No. 201702554 (with English translation of Category of Cited Documents), 11 pages.

Chinese Office Action dated Jun. 3, 2019 in Patent Application No. 201680033269.7, 3 pages.

International Search Report dated Aug. 12, 2016 in PCT/IB2016/000456 filed Apr. 8, 2016.

Brazilian Office Action dated Apr. 8, 2016, in Patent Application No. BR112017021575-6, 4 pages.

Japanese Office Action dated Aug. 4, 2020 in Japanese Patent Application No. 2018-503832 (with English language translation), 9 pages.

Indian Office Action dated Jul. 15, 2020 in Indian Patent Application No. 201727039861 (with English translation), 6 pages.

* cited by examiner

LIFTING APPARATUS

CROSS-REFERENCE TO RELATED APPLICATIONS

The present application claims priority to Singapore Patent Application No. 10201502804X and Australian Patent Application No. 2015901269, both filed Apr. 9, 2015, and incorporated herein by reference in their entirety.

FIELD

The present disclosure relates to a lifting device included in a transportation vehicle. Specifically, the transportation vehicle may be a vehicle that is employed for transporting goods in a goods-handling system, wherein goods are stored in, and retrieved from, a goods storage area in an at least partially automated fashion.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Transportation vehicles are used extensively in warehouses to transport goods (i.e., items or packages) from one location to another. For instance, transportation robots are used in a goods-handling system to provide in an at least partially automated manner, the transportation of goods from a goods storage area to operator stations.

With one such system, the transportation robots are navigated through the goods storage area by using machine detectable tape that is disposed on the floor of a warehouse along defined movement paths, or by using lasers that interact with reflective material, for example disposed on walls of the warehouse. Such transportation robots also include a lifting arrangement that is designed to controllably lift goods-storage rack relative to the ground, so that the rack can be transported by the robot.

However, existing transportation vehicles include relatively unsophisticated lifting mechanisms that incur frequent wear and tear, and are moreover cumbersome to maintain and operate. Accordingly, there is a requirement for a lifting device that provides for seamless transportation of the goods.

SUMMARY

According to an embodiment of the present disclosure is provided a lifting device for raising and lowering a contact member, the lifting device comprising: an actuator configured to move the contact member between a lowered position and a raised position, wherein in a first mode of operation of the lifting device, the actuator moves the contact member from the lowered position to the raised position without rotating the contact member about a reference axis, and wherein in a second mode of operation of the lifting device, the actuator permits rotational motion of the contact member about the reference axis from the raised position to a modified raised position.

An aspect of the present disclosure provides for a transportation vehicle comprising a body portion; and a lifting device disposed on the body portion, the lifting device including an actuator configured to move the contact member between a lowered position and a raised position, wherein in a first mode of operation of the lifting device, the actuator moves the contact member from the lowered position to the raised position without rotating the contact member about a reference axis, and wherein in a second mode of operation of the lifting device, the actuator permits rotational motion of the contact member about the reference axis from the raised position to a modified raised position.

An embodiment of the present disclosure provides for A lifting arrangement comprising: an actuator configured to move a contact member between a lowered position and a raised position, wherein in a first mode of operation of the lifting arrangement, the actuator moves the contact member from the lowered position to the raised position without rotating the contact member about a reference axis, wherein in a second mode of operation of the lifting arrangement, the actuator permits rotational motion of the contact member about the reference axis from the raised position to a modified raised position, and wherein in the second mode of operation of the lifting arrangement, the actuator restricts linear movement of the contact member in a direction that is parallel to the reference axis.

The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of the present disclosure that are provided as examples will be described in detail with reference to the following figures, wherein like numerals reference like elements, and wherein.

DETAILED DESCRIPTION

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by the appended claims.

Furthermore, where a range of values is provided, it is to be understood that each intervening value between an upper and lower limit of the range—and any other stated or intervening value in that stated range is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated. Additionally, transportation vehicle corresponds to a transportation robot, and a lifting arrangement corresponds to a lifting device that is included in the transportation vehicle. The terms are used interchangeably in the remainder of the disclosure.

Figure 1:
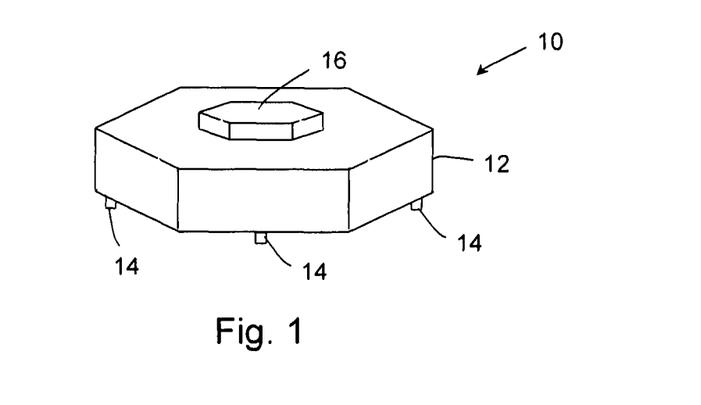
FIG. 1 illustrates a transportation vehicle in accordance with an embodiment of the present disclosure.

Turning now to FIG. 1, there is illustrated a transportation vehicle 10 that transports a goods-rack between a goods storage area in a warehouse and one or more operator stations where orders are fulfilled. Movement of the transportation vehicles 10 may be coordinated by a management system, for example located remotely and in communication with the transportation vehicle 10 through a wireless communication network.

In operation, items to be stored in the goods storage area are transported between the operator stations and the goods storage area by several transportation vehicles 10, and orders are fulfilled by transporting racks containing items included in the order from the goods storage area to the operator stations. Specifically, as described in the application PCT/IB2016/000079, which is incorporated herein by reference in its entirety, the transportation vehicle 10 transports the required goods-rack to specific operator stations in order to complete the order in a timely manner.

The transportation vehicle 10 includes a body 12, wheels 14, at least some of which are individually controllable so as to control the speed and direction of movement of the transportation vehicle 10, and a contact member 16. As shown in the illustration of FIG. 1, the contact member 16 is a contact plate. The contact plate as shown in FIG. 1 is hexagonal in shape to which a goods-rack is attached. Thus, in operation, the vehicle 10 can transport the goods-rack from one location to another. By one embodiment, the contact member 16 may be controllably raised or lowered by a processing circuit or circuitry (described later with reference of FIG. 10), relative to the body 12, in order to raise or lower a rack disposed above the transportation vehicle 10.

It must be appreciated that although the body 12 and the contact member 16 of the transportation vehicle 10 as shown in FIG. 1 have a hexagonal shape, other shapes such as a circular shape, rectangular shape, a polygonal shape and the like are very well within the scope of the present disclosure.

Figure 2:
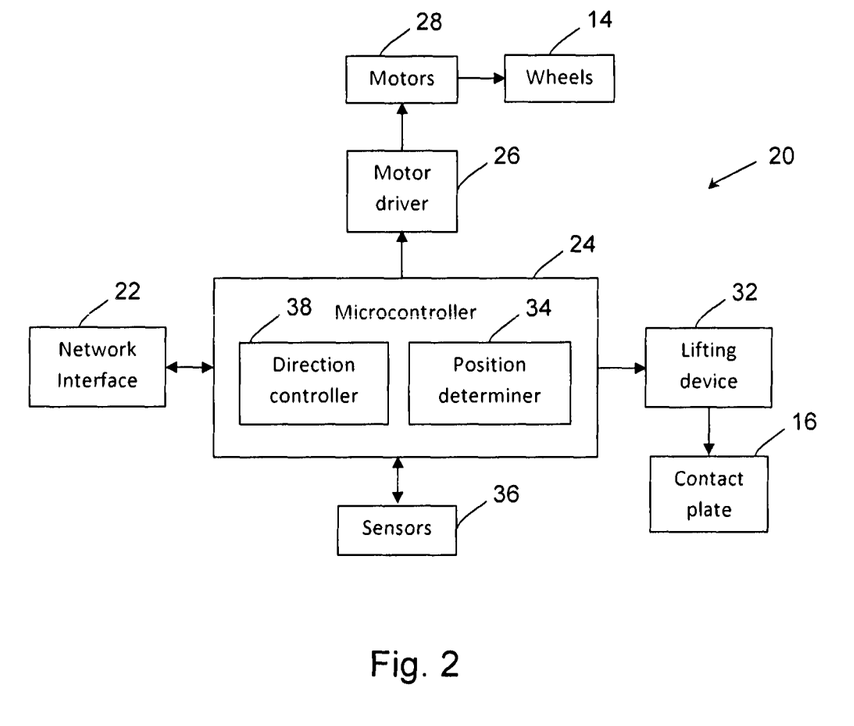
FIG. 2 illustrates an exemplary block diagram according to an embodiment, depicting functional components of the transportation vehicle.

FIG. 2 illustrates an exemplary block diagram according to an embodiment, depicting functional components 20 of the transportation vehicle 10.

The functional components 20 include a network interface 22 configured to facilitate networked communications, for example between the vehicle 10, the management system that monitors and manages the movement of the vehicle 10, and the operator stations that facilitate packing of orders by operators.

The functional components 20 further include a microcontroller 24 configured to control and coordinate operations in the transportation vehicle 10. Particularly, the microcontroller 24 includes a position determiner 34 that determines the location of the vehicle 10 using one or more sensors 36, and a direction controller 38 that controls the movement of the vehicle 10.

The microcontroller 24 communicates with a motor driver 26 that controls movement of motors 28 that are associated with the wheels 14. In this manner, the microcontroller 24 controls the speed and direction of the vehicle 10. Additionally, the functional components 20 also include a lifting device 32 that is arranged to controllably raise or lower the contact member 16 in response to instructions from the microcontroller 24.

Referring now to FIG. 3 to FIG. 7, there is depicted a lifting device 32 (referred to hereinafter as a lifting arrangement 32) that provisions for controllably raising and lowering the contact member 16 (referred to hereinafter as a contact plate 16) relative to the body 12 of the vehicle 10.

Figure 3:
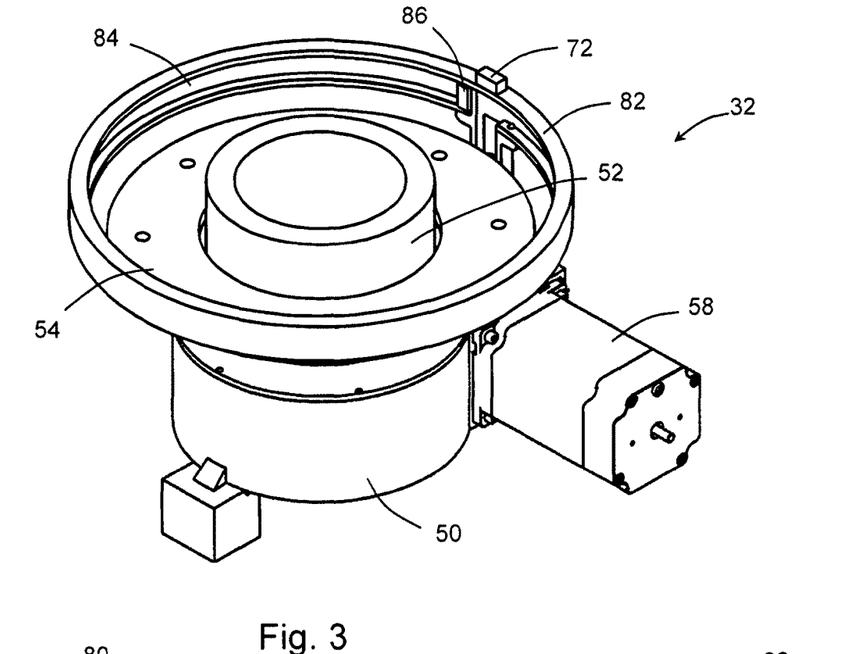
FIG. 3 depicts an exemplary perspective view of a lifting device of the transportation vehicle.
Figure 4:
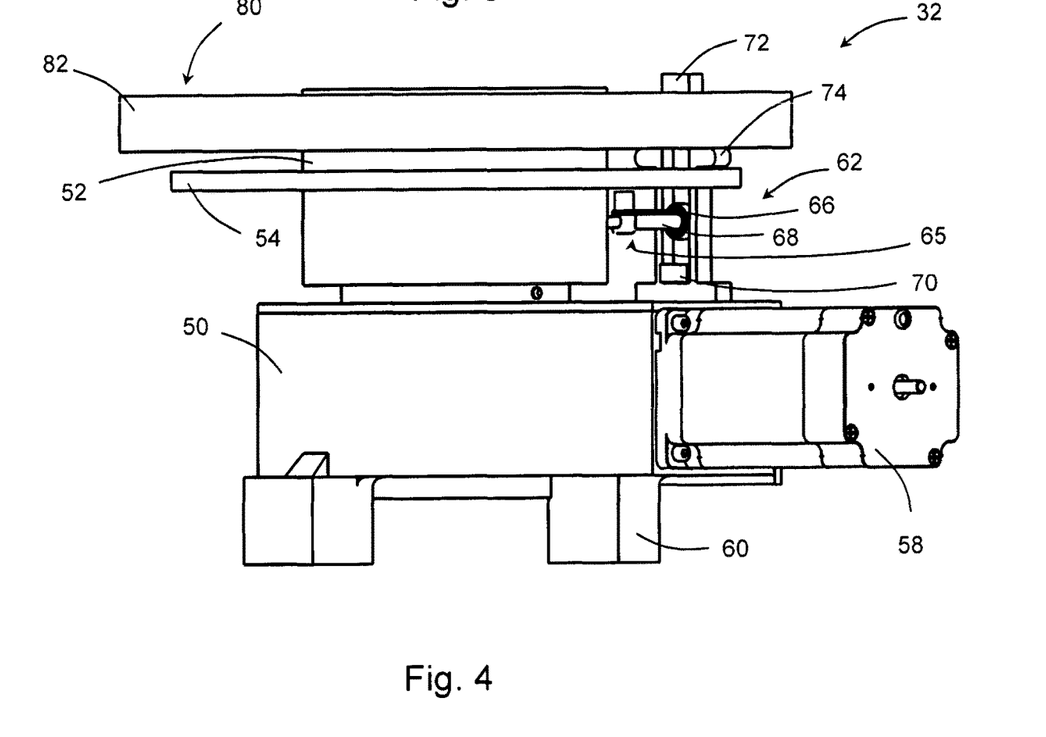
FIG. 4 illustrates an exemplary side view of the lifting device of FIG. 3.
Figure 5:
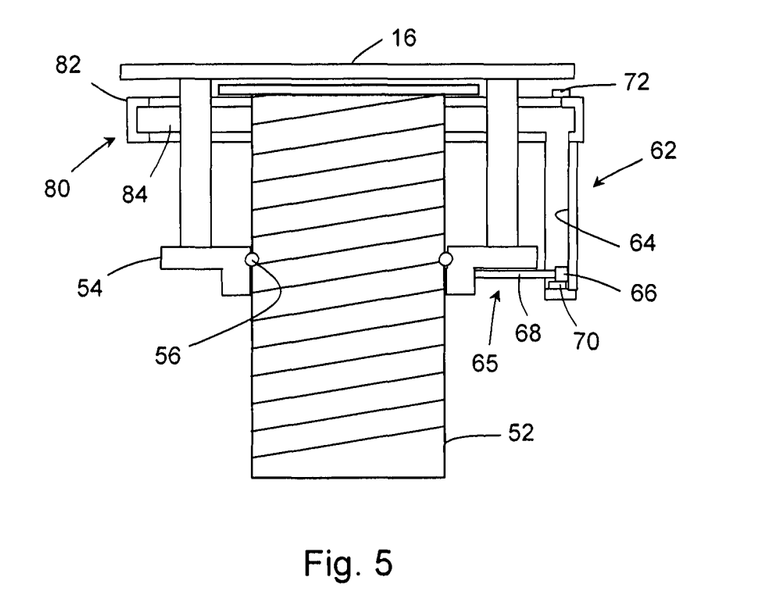
FIG. 5 illustrates according to an embodiment, an exemplary first cross-sectional view of the lifting device of FIG. 4.
Figure 6:
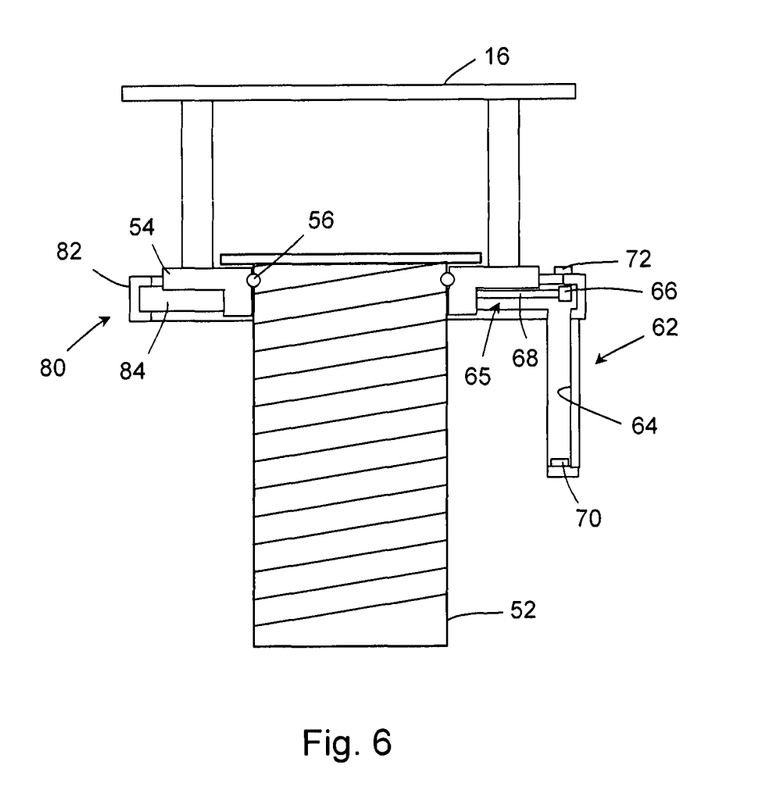
FIG. 6 illustrates according to an embodiment, an exemplary second cross-sectional view of the lifting device of FIG. 4.
Figure 7:
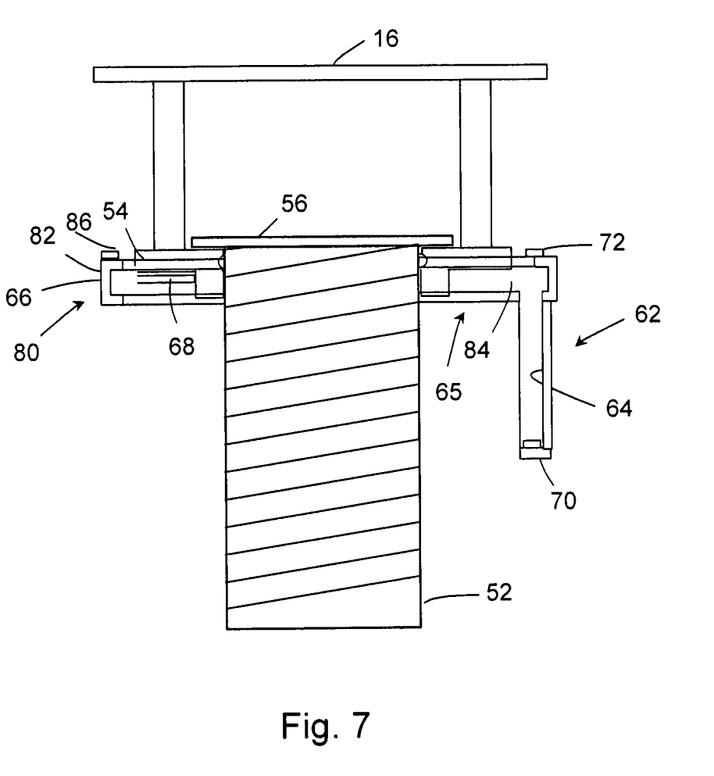
FIG. 7 illustrates according to an embodiment, an exemplary third cross-sectional view of the lifting device of FIG. 4.

FIG. 3 depicts an exemplary perspective view of a lifting arrangement 32 of the transportation vehicle, whereas FIG. 4 illustrates an exemplary side view of the lifting device of FIG. 3. FIG. 5 illustrates, according to an embodiment, an exemplary first cross-sectional view of the lifting device of FIG. 4. Specifically, FIG. 5 illustrates a cross-sectional view of the lifting device with the contact plate 16 of the transportation vehicle in a lowered position. FIG. 6 illustrates, according to an embodiment, an exemplary second cross-sectional view of the lifting device of FIG. 4. Specifically, FIG. 6 illustrates a cross-sectional view of the lifting device with the contact plate 16 of the transportation vehicle in a first raised position. Further, FIG. 7 illustrates, according to an embodiment, an exemplary third cross-sectional view of the lifting device of FIG. 4, wherein the contact plate of the transportation vehicle is positioned between the first raised position and the lowered position.

The lifting arrangement 32 includes a housing 50, a linear actuator that is designed to controllably effect linear movement of the contact plate 16 between a lowered position (as shown in FIG. 5) and a first raised position (as shown in FIG. 6). According to an embodiment, the linear actuator includes a ball screw arrangement including a ball screw portion 52 and a ball nut portion 54 that is threaded to ball screw 52. The ball screw arrangement is configured to effect movement of the ball nut 54 in a linear direction that is parallel to the axis of rotation of the ball screw 52. Specifically, the ball nut 54 is designed to move in a vertically upwards/downwards direction.

The contact plate 16 is connected to the ball nut 54, and thus linear movement and/or rotational movement of the ball screw arrangement effects a corresponding linear movement and/or rotational movement of the contact plate 16. The lifting arrangement 32 also includes a linear engagement device 62 (as shown in FIGS. 4-7) that is designed to restrain rotation of the ball nut 54, when the ball screw 52 rotates. As shown in FIGS. 5 to 7, the ball nut 54 includes ball bearings 56 that facilitate relatively low frictional rotation of the ball screw 52 relative to the ball nut 54. It must be appreciated that alternative linear actuators such as a lead screw that operate in a similar manner as described above, wherein linear movement of a nut is effected in response to rotation of a screw, are also within the scope of the present disclosure.

According to one embodiment, the linear actuator is driven by a motor 58, for example a gearbox. The motor 58 controls the rotation of the ball screw 52 as well as the linear (vertical) motion of the ball nut 54. Further, the linear engagement device 62 (as shown in FIGS. 4-7) ensures that the contact plate 16 does not rotate as the contact plate 16 moves from the lowered position as shown in FIG. 5, to the first raised position as shown in FIG. 6. It must be appreciated that the motor 58 may be a servo motor, a DC motor, an AC induction motor or the like.

By one embodiment of the present disclosure, the linear engagement device 62 is connected to the housing 50, and includes a first channel 64 that receives a projection 65 which extends from the ball nut 54. Thus, the linear engagement device 62 restricts rotation of the ball nut 54, whilst allowing the ball nut 54 to move in a vertical fashion (i.e., in a direction generally parallel to the axis of rotation of the ball screw).

According to one embodiment, the projection 65 may include a low friction device, such as a bearing 66, and a shaft 68. The bearing 66 is rotatably mounted on the shaft 68. The bearing 66 is located in the first channel 64, and facilitates relatively low friction linear movement of the shaft 68 relative to the first channel 64. It must be appreciated that, although the example as depicted in FIG. 5 includes one projection 65, one associated bearing 66, and one associated first channel 64, multiple projections, bearings, and corresponding first channels 64 may be included in the lifting arrangement 32.

By one embodiment, the first channel 64 includes a first position detector 70 disposed at a lower end of the first channel. The first position detector 70 may be a limit switch that detects when the projection 65 reaches a position relative to the first channel 64 that corresponds to the contact plate being in the lowered position as shown in FIG. 5. In other words, the position detector is configured to detect that the contact plate 16 is disposed in the lowered position. Further, the first channel 64 includes a second position detector 72 that detects when the projection 65 is disposed at a position (relative to the first channel 64) that corresponds to the first raised position as shown in FIG. 6. It must be appreciated that the position detectors 70 and 72 are not limited to only limit switches. Rather, the position detectors may be sensors such as proximity sensors and the like that are configured to detect the raised and lowered positions of the contact plate 16.

According to an embodiment, the linear engagement device 62 includes a ledge portion 74 (as shown in FIG. 4) which supports a rotational engagement device 80. The rotational engagement device 80 includes an annular member 82 in which is formed a second channel 84 as shown in FIGS. 5 and 6. The second channel 84 receives the projection 65 from the first channel 64 at a time instant corresponding to the contact plate 16 being in the first raised position as shown in FIG. 6. In the first raised position, the second channel 84 permits rotational movement of the ball nut 54 relative to the housing 50. Further, in the first raised position (i.e., when the projection 65 is located in the second channel 84), linear movement of the ball nut 54 (relative to the housing 50) is restricted. Note that linear movement of the ball nut 54 is only restricted when the projection 65 is not aligned with the first channel 64. However, when the projection is aligned with the first channel 64, the ball nut 54 is able to move upwards/downwards relative to the housing 50.

Additionally, it must be appreciated that the lifting arrangement as described above may include multiple annular members 82 at different predetermined heights, thereby provisioning for the rotational movement of the ball nut 54 at different heights.

In operation, as a part of a goods-handling system, the transportation vehicle 10 is instructed to retrieve a selected rack from a good storage area in a warehouse. The vehicle 10 moves to the selected rack in response to controls from the direction controller 38 (FIG. 2). When the transportation vehicle 10 arrives at a location under a rack, the lifting device 32 operates in a first mode of operation. Specifically, in the first mode of operation, the lifting device has the contact plate in the lowered position (as shown in FIG. 5). Thereafter, the lifting device under the control of the microcontroller 24 activates the motor 58, which causes the ball screw 52 to rotate.

Note that in the lowered position, since the ball nut 54 is restrained by the linear engagement device 62 from rotating (relative to the housing 50), the rotational motion of the ball screw 52 causes (i.e., induces) the ball nut 54 to move upwardly relative to the ball screw 52. In doing so, the projection 65 moves in an upward direction in the first channel 64, and thereby moves the contact plate 16 from the lowered position as shown in FIG. 5 to the first raised position shown in FIG. 6. In this manner, rotation of the ball screw 52 causes the contact plate 16 to move upwards without causing the contact plate to rotate. Accordingly, by restricting the rotational motion of the ball nut 54 in the above described first mode of operation, provides the lifting arrangement of the present disclosure the advantageous ability of restricting the rotation of a rack that is disposed above the contact plate 16. Therefore, potential collision of the racks with other racks and/or nearby obstacles is avoided.

When the contact plate 16 reaches the first raised position as shown in FIG. 6, the second limit switch 72 is triggered upon contact with the projection 65. The second limit switch 72 upon being triggered deactivates the motor 58, and thereby ceases the rotational motion of the ball nut 52. Note that at an upper end of the first channel 64, the first channel 64 extends into the second channel 84, and therefore the projection moves from the first channel 64 to the second channel 84 as the contact plate 16 moves from the lowered position shown in FIG. 5 to the first raised position shown in FIG. 6. The transportation vehicle 10 with the supported rack can then be moved to the desired destination, for example from the goods storage area to an operator station.

According to an embodiment of the present disclosure, the lifting arrangement operates in a second mode of operation. During movement of the rack, there may be a desire to change the rotational position of the contact plate 16 and thereby the angular position of the supported rack. In such a scenario, the device motor 58 is reactivated which causes the ball screw 52 to rotate. Specifically, in the second mode of operation, the projection 65 is located in the second channel 84. As stated previously, in such a scenario, linear motion of the ball nut 54 is restricted, whereas rotational motion of the ball nut 54 is permitted. Accordingly, the ball nut 54 is free to rotate relative to the housing 50, whereby a rotational motion of the ball nut 54 causes an angular displacement of the rack.

Additionally, since the projection 65 is restricted from moving upwards relative to the ball screw 52 by contact with the second channel 84, the rotational motion of the ball screw 52 causes a rotational motion of the ball nut 54. Consequently, the rotation of the ball screw 52 effects rotational movement of the projection 65 in the second channel 84 and thus causes rotation of the contact plate 16 from the first raised position shown in FIG. 6 to a second raised position. By one embodiment, a third position detector 86 (i.e., a third limit switch) as shown in FIG. 7 is disposed at a location corresponding to an end of the second channel 84 away from the second limit switch 72. The third position detector 86 is used to deactivate the motor 58 when the contact plate 16 has reached the second raised position.

According to an embodiment of the present disclosure, during movement of the rack, it may be desirable to change the direction of motion of the transportation vehicle 10. In one such instant, it may be desirable to change the direction of motion of the vehicle 10 without changing the rotational position of the contact plate 16 and thereby the supported rack. In such a scenario, the direction controller 38 of the vehicle 10 is configured to control the movement of motors 28 in a manner such that the housing 50 is rotated in a direction that is opposite to the direction of rotation of the contact plate 16. In this manner, by ensuring that the respective rotations of the contact plate 16 and the housing 50 are substantially equal and opposite, the direction of movement of the vehicle is changed without changing the absolute orientation of the contact plate 16 and supported rack.

According to one embodiment of the present disclosure, the lifting arrangement 32 operates in a third mode of operation. Specifically, when the vehicle 10 reaches the desired location with the contact plate 16 being disposed in the first raised position, the lifting arrangement 32, for example, under control of the microcontroller 24, activates the motor 58 to cause the ball screw 52 to rotate in an opposite direction (i.e., a rotational direction that is opposite to the rotational direction of ball screw in the first and second mode of operation). The ball screw 52 upon being rotated in the opposite direction, causes the ball nut 54 to move vertically downwards (relative to the ball screw 52), and thereby causes the projection 65 to move in a downward fashion in the first channel 64. Accordingly, the contact plate 16 moves from the first raised position shown in FIG. 6 to the lowered position shown in FIG. 5.

By one embodiment, the contact plate 16 may be disposed in the second raised position or between the first and second raised positions when the vehicle 10 reaches the desired location. In such a scenario, the lifting device 32, under control of the microcontroller 24, initiates an opposite rotational movement of the projection 65 in the second channel 84 and thus rotates the contact plate 16 to the first raised position shown in FIG. 6 prior to effecting linear downwardly movement of the contact plate from the first raised position to the lowered position.

According to an embodiment of the present disclosure, the projection 65 may be maintained at any location within the first channel 64. In other words, the projection 65 may be disposed at any desirable height within the first channel 64. The projection 65 extends from the ball nut 54. The movement of the projection 65 is controlled by the movement of the ball nut 54. Note however, that a movement of the ball nut 54 is allowed only upon a corresponding rotation of the ball screw 52. The rotation of the ball screw 52 is provided by the motor 58. Accordingly, in order to maintain the projection 65 at a certain height within the first channel 64 (i.e., between the lowered position and the first raised position), the motor can be switched off when the projection is at the desired location within the first channel 64, which ceases the rotation of the ball screw 52. By ceasing rotational movement of the ball screw 52 prohibits linear movements of the ball nut 54, and thereby any linear movement of the projection 65.

Figure 8:
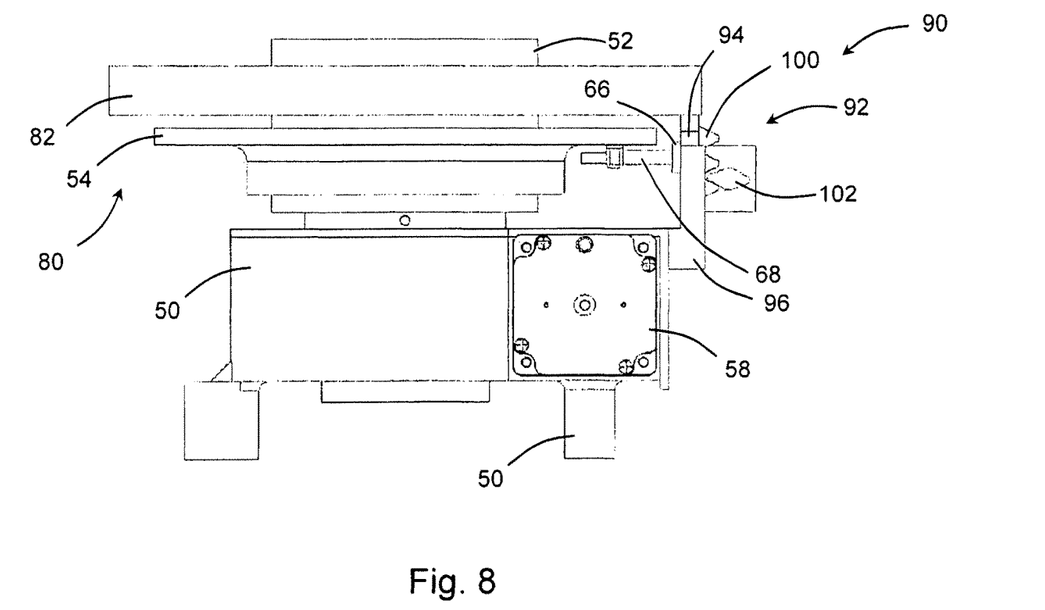
FIG. 8 illustrates according to an embodiment, an exemplary first view of a lifting arrangement.
Figure 9:
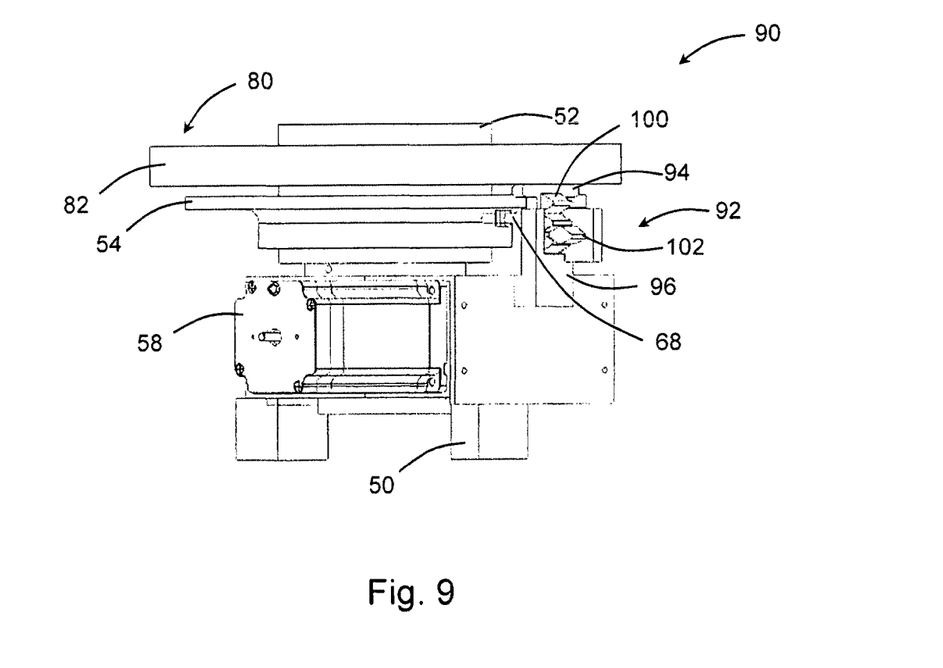
FIG. 9 depicts according to an embodiment, an exemplary second view of the lifting arrangement.

Turning now to FIG. 8 is illustrated according to an embodiment, an exemplary first view of a lifting arrangement 90. FIG. 9 depicts according to an embodiment, an exemplary second view of the lifting arrangement 90. In the following description of the lifting arrangement 90, like and similar features are indicated with like reference numerals as those depicted in FIGS. 4-7. Accordingly, for the sake of being non-repetitive, a description of similar components is omitted herein.

The lifting arrangement 90 includes a linear engagement device 92 that has a first portion 94 which is engaged with, and reciprocally movable, relative to a second portion 96. The first and second portions 94 and 96, respectively, together define a first channel of the lifting arrangement 90. The first channel receives the projection 65 that includes the shaft 68 and the bearing 66.

It must be appreciated that since the first and second portions are reciprocally movable relative to each other, the length of the first channel is adjustable. In this manner, having the first portion 94 being connected to the annular member 82, the height of the annular member 82 is adjustable, and consequently, the height of rotation of the contact plate 16 may be adjusted.

According to an embodiment of the present disclosure, the reciprocal movement of the first portion 94 relative to the second portion 96 is effected by providing (i.e., attaching) one of the first and second portions 94, 96 with a rack 100, and providing the other of the first and second portions with a pinion 102. It must be appreciated that any suitable arrangement for effecting controlled movement of the first portion 94 relative to the second portion 96 is well within the scope of the present disclosure. Additionally, a suitable motor may be provided for effecting rotation of the pinion 102 and thereby linear movement of the rack 100, and expansion or contraction of the first channel. Specifically, the pinion 102 may be rotated via the motor thereby causing a motion (vertically upwards/downwards) of the first and second portions of the engagement device 92. The motion of the engagement device 92 results in a linear vertical motion of the rack 100.

Each of the functions of the described embodiments may be implemented by one or more processing circuits. A processing circuit includes a programmed processor (for example, processor 1003 in FIG. 10), as a processor includes circuitry. A processing circuit also includes devices such as an application-specific integrated circuit (ASIC) and circuit components that are arranged to perform the recited functions.

Figure 10:
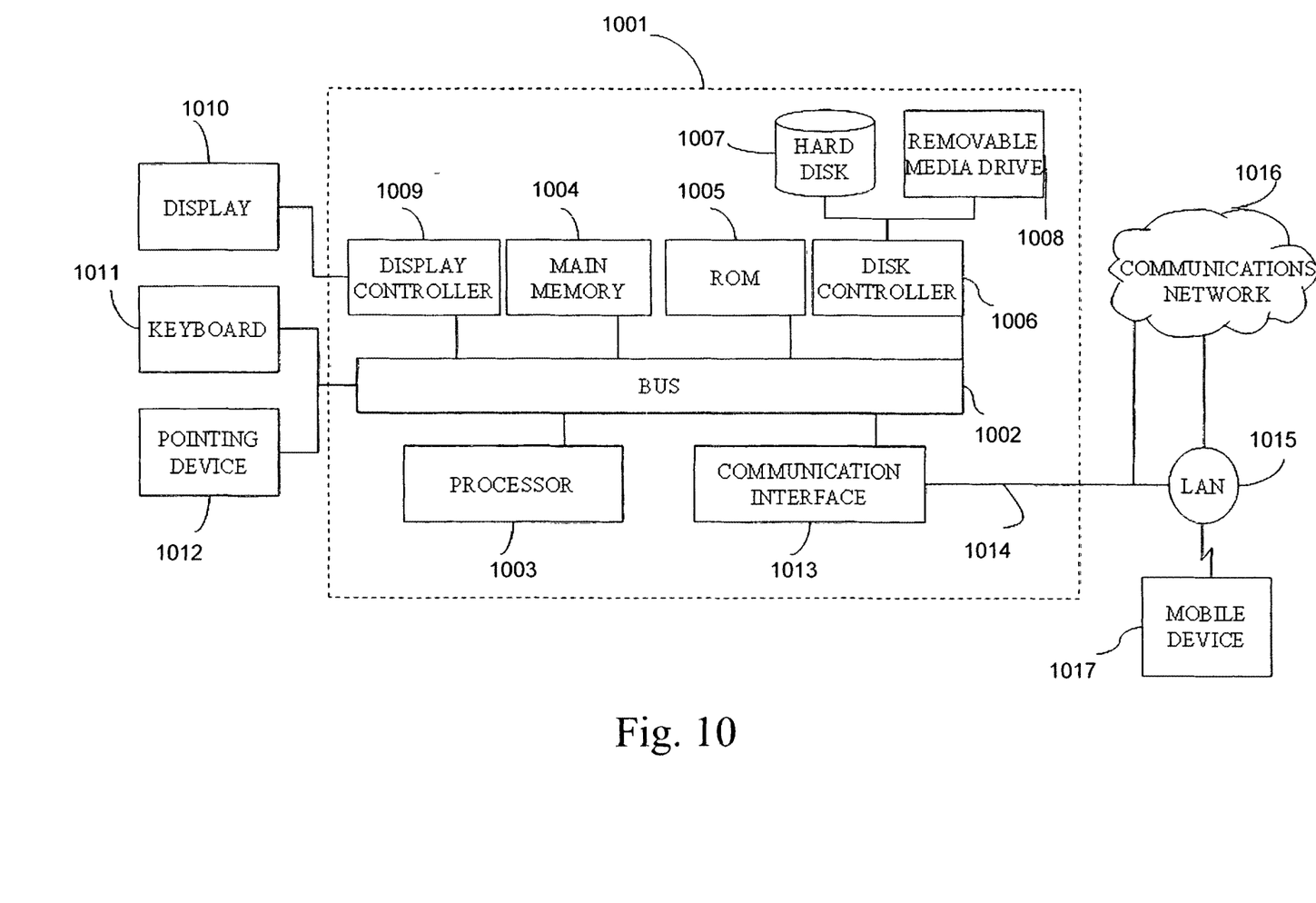
FIG. 10 illustrates a block diagram of a computing device according to one embodiment.

The various features discussed above may be implemented by a computer system (or programmable logic). FIG. 10 illustrates such a computer system 1001. In one embodiment, the computer system 1001 is a particular, special-purpose machine when the processor 1003 is programmed to perform navigational processes of the vehicle, computing compensation path, and other functions described above.

The computer system 1001 includes a disk controller 1006 coupled to the bus 1002 to control one or more storage devices for storing information and instructions, such as a magnetic hard disk 1007, and a removable media drive 1008 (e.g., floppy disk drive, read-only compact disc drive, read/write compact disc drive, compact disc jukebox, tape drive, and removable magneto-optical drive). The storage devices may be added to the computer system 1001 using an appropriate device interface (e.g., small computer system interface (SCSI), integrated device electronics (IDE), enhanced-IDE (E-IDE), direct memory access (DMA), or ultra-DMA).

The computer system 1001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1001 may also include a display controller 1009 coupled to the bus 1002 to control a display 1010, for displaying information to a computer user. The computer system includes input devices, such as a keyboard 1011 and a pointing device 1012, for interacting with a computer user and providing information to the processor 1003. The pointing device 1012, for example, may be a mouse, a trackball, a finger for a touch screen sensor, or a pointing stick for communicating direction information and command selections to the processor 1003 and for controlling cursor movement on the display 1010.

The processor 1003 executes one or more sequences of one or more instructions contained in a memory, such as the main memory 1004. Such instructions may be read into the main memory 1004 from another computer readable medium, such as a hard disk 1007 or a removable media drive 1008. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer system 1001 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1001, for driving a device or devices for implementing the features of the present disclosure, and for enabling the computer system 1001 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1003 for execution. A computer readable medium may take many forms, including but not limited to, non-volatile media or volatile media. Non-volatile media includes, for example, optical, magnetic disks, and magneto-optical disks, such as the hard disk 1007 or the removable media drive 1008. Volatile media includes dynamic memory, such as the main memory 1004. Transmission media, on the contrary, includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 1003 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1001 may receive the data on the telephone line and place the data on the bus 1002. The bus 1002 carries the data to the main memory 1004, from which the processor 1003 retrieves and executes the instructions. The instructions received by the main memory 1004 may optionally be stored on storage device 1007 or 1008 either before or after execution by processor 1003.

The computer system 1001 also includes a communication interface 1013 coupled to the bus 1002. The communication interface 1013 provides a two-way data communication coupling to a network link 1014 that is connected to, for example, a local area network (LAN) 1015, or to another communications network 1010 such as the Internet. For example, the communication interface 1013 may be a network interface card to attach to any packet switched LAN. As another example, the communication interface 1013 may be an integrated services digital network (ISDN) card. Wireless links may also be implemented. In any such implementation, the communication interface 1013 sends and receives electrical, electromagnetic or optical signals that carry digital data streams representing various types of information.

The network link 1014 typically provides data communication through one or more networks to other data devices. For example, the network link 1014 may provide a connection to another computer through a local network 1015 (e.g., a LAN) or through equipment operated by a service provider, which provides communication services through a communications network 1010. The local network 1014 and the communications network 1010 use, for example, electrical, electromagnetic, or optical signals that carry digital data streams, and the associated physical layer (e.g., CAT 5 cable, coaxial cable, optical fiber, etc.). The signals through the various networks and the signals on the network link

1014 and through the communication interface 1013, which carry the digital data to and from the computer system 1001 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1001 can transmit and receive data, including program code, through the network(s) 1015 and 1010, the network link 1014 and the communication interface 1013. Moreover, the network link 1014 may provide a connection through a LAN 1015 to a mobile device 1017 such as a personal digital assistant (PDA) laptop computer, or cellular telephone.

It must be appreciated that embodiments are described herein for a vehicle, such as a transportation vehicle or a transportation robot. However, embodiments described herein can be applied to other automatically guided vehicles. Examples include, but are not limited to a four-wheel drive vehicle, or a vehicle using an Ackerman steering system in which the front inside wheel turns into a curve at a greater radius than the front outside wheel.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

Furthermore, the foregoing discussion discloses and describes merely exemplary embodiments of the present invention. As will be understood by those skilled in the art, the present disclosure may be embodied in other specific forms without departing from the spirit or essential characteristics thereof. Accordingly, the present disclosure is intended to be illustrative and not limiting of the scope, as well as the claims. The disclosure, including any readily discernible variants of the teachings herein, defines in part, the scope of the foregoing claim terminology such that no subject matter is dedicated to the public. Additionally, the above disclosure also encompasses the embodiments listed below:

(1) A lifting device for raising and lowering a contact member, the lifting device comprising: an actuator configured to move the contact member between a lowered position and a raised position, wherein in a first mode of operation of the lifting device, the actuator moves the contact member from the lowered position to the raised position without rotating the contact member about a reference axis, and wherein in a second mode of operation of the lifting device, the actuator permits rotational motion of the contact member about the reference axis from the raised position to a modified raised position.

(2) The lifting device of (1), wherein in the second mode of operation of the lifting device, the actuator restricts linear movement of the contact member in a direction that is parallel to the reference axis.

(3) The lifting device according to (1) or (2), wherein the actuator includes a screw portion and a nut portion, the nut portion being fastened to the screw portion in a threaded fashion.

(4) The lifting device according to (3), wherein in the first mode of operation of the lifting device, the actuator permits rotational motion of the screw portion and linear motion of the nut portion.

(5) The lifting device according to (4), wherein in the second mode of operation of the lifting device, the actuator permits only rotational motion of the screw portion and the nut portion.

(6) The lifting device according to (4) or (5), wherein in a third mode of operation of the lifting device, the actuator is configured to rotate the screw portion in a direction that is opposite of the rotational direction of the screw portion in the first mode of operation of the lifting device, and wherein the actuator is configured to move the nut in a linearly downward direction.

(7) The lifting device (1), further comprising: an engagement member including a shaft connected at a first end to a nut portion of the actuator and having a bearing rotatably mounted on a second end of the shaft, the second end of the shaft being away from the first end and being disposed in a first channel that permits in the first mode of operation of the lifting device, a movement of the shaft along a length of the first channel and restricts movement of the shaft in a direction that is perpendicular to the length of the first channel.

(8) The lifting device according to (7), wherein the contact member is connected to the nut portion of the actuator and a linear movement of the shaft along the first channel induces a linear movement of the contact member.

(9) The lifting device of (1)-(8), further comprising: a rotational member that includes a second channel designed to receive the shaft from the first channel when the contact member is in the raised position.

(10) The lifting device of (9), wherein the rotational member permits only rotational movement of the shaft about the reference axis, in the second mode of operation of the lifting device.

(11) The lifting device according to (9) or (10), wherein the rotational member is substantially annular in structure and is affixed to the nut portion of the actuator by a ledge.

(12) The lifting device of (1), further comprising: an engagement member including a first portion and a second portion, the first portion being engaged with and reciprocally movable with respect to the second portion, such that a length of the first channel formed by the first and second portions is adjustable.

(13) The lifting device of (12), further comprising: a rack attached to the first portion of the engagement member, and a pinion attached to the second portion of the engagement member, wherein a rotational motion of the pinion induces a linear motion of the rack.

(14) The lifting device according to (1)-(13), further comprising at least one position detector configured to detect one of a linear movement and a rotational movement of the contact member.

(15) The lifting device of (14), wherein the at least one position detector is one of a limit switch and a proximity sensor.

(16) The lifting device according to (4) or (5), wherein the reference axis is substantially parallel to the length of the first channel.

(17) The lifting device of (1), wherein the actuator is one of a ball-screw type of linear actuator and a lead-screw type of linear actuator.

(18) A transportation vehicle comprising: a body portion; and a lifting device disposed on the body portion, the lifting device including an actuator configured to move the contact member between a lowered position and a raised position, wherein in a first mode of operation of the lifting device, the actuator moves the contact member from the lowered position to the raised position without rotating the contact member about a reference axis, and wherein in a second mode of operation of the lifting device, the actuator permits rotational motion of the contact member about the reference axis from the raised position to a modified raised position.

(19) The transportation vehicle of (18), wherein in the second mode of operation of the lifting device, the actuator restricts linear movement of the contact member in a direction that is parallel to the reference axis.

(20) The transportation vehicle according to (18) or (19), wherein the actuator includes a screw portion and a nut portion, the nut portion being fastened to the screw portion in a threaded fashion.

(21) The transportation vehicle according to (20), wherein in the first mode of operation of the lifting device, the actuator permits rotational motion of the screw portion and linear motion of the nut portion.

(22) The transportation vehicle of (21), wherein in the second mode of operation of the lifting device, the actuator permits only rotational motion of the screw portion and the nut portion.

(23) The transportation vehicle according to (21) or (22), wherein in a third mode of operation of the lifting device, the actuator is configured to rotate the screw portion in a direction that is opposite of the rotational direction of the screw portion in the first mode of operation of the lifting device, and wherein the actuator is configured to move the nut in a linearly downward direction.

(24) The transportation vehicle of (18), wherein the lifting device further comprising: an engagement member including a shaft connected at a first end to a nut portion of the actuator and having a bearing rotatably mounted on a second end of the shaft, the second end of the shaft being away from the first end and being disposed in a first channel that permits in the first mode of operation of the lifting device, a movement of the shaft along a length of the first channel and restricts movement of the shaft in a direction that is perpendicular to the length of the first channel.

(25) The transportation vehicle of (24), wherein the contact member is connected to the nut portion of the actuator and a linear movement of the shaft along the first channel induces a linear movement of the contact member.

(26) The transportation vehicle as in any one of (18)-(25), the lifting device further comprising: a rotational member that includes a second channel designed to receive the shaft from the first channel when the contact member is in the raised position.

(27) The transportation vehicle of (26), wherein the rotational member permits only rotational movement of the shaft about the reference axis, in the second mode of operation of the lifting device.

(28) The transportation vehicle according to (25) or (26), wherein the rotational member is substantially annular in structure and is affixed to the nut portion of the actuator by a ledge.

(29) The transportation vehicle of (18), wherein the lifting device further comprising: an engagement member including a first portion and a second portion, the first portion being engaged with and reciprocally movable with respect to the second portion, such that a length of the first channel formed by the first and second portions is adjustable.

(30) The transportation vehicle of (29), further comprising: a rack attached to the first portion of the engagement member, and a pinion attached to the second portion of the engagement member, wherein a rotational motion of the pinion induces a linear motion of the rack.

(31) The transportation vehicle according to any one of (18)-(30), further comprising at least one position detector configured to detect one of a linear movement and a rotational movement of the contact member.

(32) The transportation vehicle according to (31), wherein the at least one position detector is one of a limit switch and a proximity sensor.

(33) The transportation vehicle according to (31) or (32), wherein the reference axis is substantially parallel to the length of the first channel.

(34) The transportation vehicle of (18), wherein the actuator is one of a ball-screw type of linear actuator and a lead-screw type of linear actuator.

(35) The transportation vehicle of (18), further comprising: a motor configured to rotate the body portion of the transportation vehicle about the reference axis in a direction opposite to the direction of rotation of the contact member.

(36) The transportation vehicle of (35), wherein rotating the body portion of the transportation vehicle in the direction opposite to the direction of rotation of the contact member does not change an absolute orientation of the contact member with respect to the body portion of the transportation vehicle.

(37) A lifting arrangement comprising: an actuator configured to move a contact member between a lowered position and a raised position, wherein in a first mode of operation of the lifting arrangement, the actuator moves the contact member from the lowered position to the raised position without rotating the contact member about a reference axis, wherein in a second mode of operation of the lifting arrangement, the actuator permits rotational motion of the contact member about the reference axis from the raised position to a modified raised position, and wherein in the second mode of operation of the lifting arrangement, the actuator restricts linear movement of the contact member in a direction that is parallel to the reference axis.

(38) The lifting arrangement of (37), wherein the actuator includes a screw portion and a nut portion, the nut portion being fastened to the screw portion in a threaded fashion.

(39) The lifting arrangement according to (38), wherein in the first mode of operation of the lifting arrangement, the actuator permits rotational motion of the screw portion and linear motion of the nut portion.

(40) The lifting arrangement according to (39), wherein in the second mode of operation of the lifting arrangement, the actuator permits only rotational motion of the screw portion and the nut portion.

(41) The lifting arrangement according to (38) or (39), wherein in a third mode of operation of the lifting arrangement, the actuator is configured to rotate the screw portion in a direction that is opposite of the rotational direction of the screw portion in the first mode of operation of the lifting arrangement, and wherein the actuator is configured to move the nut in a linearly downward direction.

(42) The lifting arrangement of (37), further comprising: an engagement member including a shaft connected at a first end to a nut portion of the actuator and having a bearing rotatably mounted on a second end of the shaft, the second end of the shaft being away from the first end and being disposed in a first channel that permits in the first mode of operation of the lifting arrangement, a movement of the shaft along a length of the first channel and restricts movement of the shaft in a direction that is perpendicular to the length of the first channel.

(43) The lifting arrangement according to (42), wherein the contact member is connected to the nut portion of the actuator and a linear movement of the shaft along the first channel induces a linear movement of the contact member.

(44) The lifting arrangement as in any one of (37)-(43), further comprising: a rotational member that includes a second channel designed to receive the shaft from the first channel when the contact member is in the raised position.

(45) The lifting arrangement of (44), wherein the rotational member permits only rotational movement of the shaft about the reference axis, in the second mode of operation of the lifting arrangement.

(46) The lifting arrangement according to (44) or (45), wherein the rotational member is substantially annular in structure and is affixed to the nut portion of the actuator by a ledge.

(47) The lifting arrangement of (37), further comprising: an engagement member including a first portion and a second portion, the first portion being engaged with and reciprocally movable with respect to the second portion, such that a length of the first channel formed by the first and second portions is adjustable.

(48) The lifting arrangement of (47), further comprising: a rack attached to the first portion of the engagement member, and a pinion attached to the second portion of the engagement member, wherein a rotational motion of the pinion induces a linear motion of the rack.

(49) The lifting arrangement according to any one (37)-(48), further comprising at least one position detector configured to detect one of a linear movement and a rotational movement of the contact member.

(50) The lifting arrangement of (49), wherein the at least one position detector is one of a limit switch and a proximity sensor.

(51) The lifting arrangement according to (42) or (43), wherein the reference axis is substantially parallel to the length of the first channel.

(52) The lifting arrangement of (37), wherein the actuator is one of a ball-screw type of linear actuator and a lead-screw type of linear actuator.

The invention claimed is:

1. A lifting device for raising and lowering a contact member, the lifting device comprising:
   an actuator configured to move the contact member between a lowered position and a raised position; and
   an engagement member including a shaft connected at a first end to a nut portion of the actuator and having a bearing rotatably mounted on a second end of the shaft, the second end of the shaft being away from the first end and being disposed in a first channel that permits in a first mode of operation of the lifting device, a movement of the shaft along a length of the first channel and restricts movement of the shaft in a direction that is perpendicular to the length of the first channel,
   wherein in the first mode of operation of the lifting device, the actuator moves the contact member from the lowered position to the raised position without rotating the contact member about a reference axis, and
   wherein in a second mode of operation of the lifting device,
   the actuator permits rotational motion of the contact member about the reference axis from the raised position to a modified raised position, and
   the actuator restricts linear movement of the contact member in a direction that is parallel to the reference axis.

2. The lifting device according to claim 1, wherein the contact member is connected to the nut portion of the actuator and a linear movement of the shaft along the first channel induces the linear movement of the contact member.

3. The lifting device according to claim 1, further comprising:
   a rotational member that includes a second channel designed to receive the shaft from the first channel when the contact member is in the raised position.

4. The lifting device of claim 3, wherein the rotational member permits only rotational movement of the shaft about the reference axis, in the second mode of operation of the lifting device.

5. The lifting device according to claim 3, wherein the rotational member is substantially annular in structure and is affixed to the nut portion of the actuator by a ledge.

6. The lifting device according to claim 1, wherein the reference axis is substantially parallel to the length of the first channel.

7. A transportation vehicle comprising:
   a body portion; and
   a lifting device disposed on the body portion, the lifting device including:
      an actuator configured to move a contact member between a lowered position and a raised position, and
      an engagement member including a shaft connected at a first end to a nut portion of the actuator and having a bearing rotatably mounted on a second end of the shaft, the second end of the shaft being away from the first end and being disposed in a first channel that permits in a first mode of operation of the lifting device, a movement of the shaft along a length of the first channel and restricts movement of the shaft in a direction that is perpendicular to the length of the first channel,
   wherein in the first mode of operation of the lifting device, the actuator moves the contact member from the lowered position to the raised position without rotating the contact member about a reference axis, and
   wherein in a second mode of operation of the lifting device,
   the actuator permits rotational motion of the contact member about the reference axis from the raised position to a modified raised position, and
   the actuator restricts linear movement of the contact member in a direction that is parallel to the reference axis.

8. The transportation vehicle of claim 7, wherein the contact member is connected to the nut portion of the actuator and a linear movement of the shaft along the first channel induces the linear movement of the contact member.

9. The transportation vehicle according to claim 7, the lifting device further comprising:
   a rotational member that includes a second channel designed to receive the shaft from the first channel when the contact member is in the raised position.

10. The transportation vehicle of claim 9, wherein the rotational member permits only rotational movement of the shaft about the reference axis, in the second mode of operation of the lifting device.

11. The transportation vehicle according to claim 9, wherein the rotational member is substantially annular in structure and is affixed to the nut portion of the actuator by a ledge.

12. The transportation vehicle according to claim 7, wherein the reference axis is substantially parallel to the length of the first channel.

13. The transportation vehicle of claim 7, further comprising:
- a motor configured to rotate the body portion of the transportation vehicle about the reference axis in a direction opposite to a direction of rotation of the contact member.

14. The transportation vehicle of claim 13, wherein rotating the body portion of the transportation vehicle in the direction opposite to the direction of rotation of the contact member does not change an absolute orientation of the contact member with respect to the body portion of the transportation vehicle.

\* \* \* \* \*